US010666437B2

(12) United States Patent
Kurdziel et al.

(10) Patent No.: US 10,666,437 B2
(45) Date of Patent: May 26, 2020

(54) CUSTOMIZABLE ENCRYPTION/DECRYPTION ALGORITHM

(71) Applicant: Harris Solutions NY, Inc., Rochester, NY (US)

(72) Inventors: Michael T. Kurdziel, Rochester, NY (US); Steven M. Farris, Webster, NY (US); Alan R. Kaminsky, Rochester, NY (US); Stanislaw P. Radziszowski, West Henrietta, NY (US); Marcin X. Lukowiak, Rochester, NY (US); Stephanie Soldavini, Rockville, MD (US); Daniel F. Stafford, Avon, NY (US)

(73) Assignee: HARRIS SOLUTIONS NY, INC., Rochester, NY (US)

( * ) Notice: Subject to any disclaimer, the term of this patent is extended or adjusted under 35 U.S.C. 154(b) by 206 days.

(21) Appl. No.: 15/805,925

(22) Filed: Nov. 7, 2017

(65) Prior Publication Data

US 2019/0140829 A1    May 9, 2019

(51) Int. Cl.
*H04L 29/06*        (2006.01)
*H04L 9/14*         (2006.01)
(Continued)

(52) U.S. Cl.
CPC ............... *H04L 9/14* (2013.01); *G09C 1/00* (2013.01); *H04L 9/0631* (2013.01);
(Continued)

(58) Field of Classification Search
CPC ....... H04L 9/14; H04L 9/0662; H04L 9/0631; H04L 9/001; H04L 9/06; H04L 9/0869; G09C 1/00
See application file for complete search history.

(56) References Cited

U.S. PATENT DOCUMENTS 6,601,206 B1 *  7/2003  Marvasti .......... H03M 13/6312
                                              708/404
8,605,897 B2   12/2013  Golic
                        (Continued)

FOREIGN PATENT DOCUMENTS

EP          2975798 A1     1/2016

OTHER PUBLICATIONS

Kelly, M., "Design and Cryptanalysis of a Customizable Authenticated Encryption Algorithm," RIT Computer Engineering M.S. thesis, Aug. 2014. http://scholarworks.rit.edu/theses/8325/.
(Continued)

*Primary Examiner* — Mahfuzur Rahman
(74) *Attorney, Agent, or Firm* — Fox Rothschil LLP; Robert J. Sacco; Carol E. Thorstad-Forsyth

(57) ABSTRACT

Systems (100) and methods (700) for customizing a cryptographic algorithm. The methods comprise: providing an electronic device with the cryptographic algorithm implementing a permutation function $f$ configured to produce a first keystream using bits input thereto, the permutation function $f$ comprising a round function $f_{round}$ consisting of a mixing layer in which input bits are combined together; and customizing the mixing layer of the permutation function $f$ while the electronic device is in the field. The mixing layer is customized by: receiving, by the electronic device, a first user-software interaction for entering a first bit string comprising a plurality of first arbitrary bits; breaking the first bit string into a plurality of equal length segments each comprising only a portion of the plurality of first bits; and translating each of the equal length segments into irreducible polynomial coefficients and/or an irreducible polynomial identifier.

32 Claims, 8 Drawing Sheets

(51) Int. Cl.
*G09C 1/00* (2006.01)
*H04L 9/06* (2006.01)
*H04L 9/00* (2006.01)
*H04L 9/08* (2006.01)

(52) U.S. Cl.
CPC ............ *H04L 9/0662* (2013.01); *H04L 9/001* (2013.01); *H04L 9/06* (2013.01); *H04L 9/0869* (2013.01)

(56) References Cited

U.S. PATENT DOCUMENTS

| | | | |
|---|---|---|---|
| 8,666,064 B2 | 3/2014 | Choi et al. | |
| 8,687,800 B2 | 4/2014 | Patel | |
| 8,713,311 B1 | 4/2014 | Roskind | |
| 8,751,822 B2 | 6/2014 | Anderson | |
| 8,756,429 B2 | 6/2014 | Banerjee, Jr. et al. | |
| 8,756,674 B2 | 6/2014 | Ronda et al. | |
| 9,240,853 B2* | 1/2016 | Nikopour | H04B 7/0413 |
| 9,438,416 B2 | 9/2016 | Kurdziel et al. | |
| 2002/0150238 A1* | 10/2002 | Peting | H04L 9/34 |
| | | | 380/28 |
| 2005/0097432 A1* | 5/2005 | Obuchi | H03M 13/091 |
| | | | 714/800 |
| 2007/0071236 A1 | 3/2007 | Kohnen | |
| 2007/0079211 A1* | 4/2007 | Kwak | H03M 13/091 |
| | | | 714/758 |
| 2011/0206201 A1* | 8/2011 | Garcia Morchon | H04L 9/0838 |
| | | | 380/44 |
| 2012/0237020 A1 | 9/2012 | Pruss et al. | |
| 2015/0270967 A1* | 9/2015 | Susella | H04L 9/3093 |
| | | | 380/30 |

OTHER PUBLICATIONS

Bertoni, G., et al., "Duplexing the Sponge: Single-Pass Authenticated Encryption and Other Applications," International Workshop on Selected Areas in Cryptography, 2011.

Indrajit Das et al., "Random S-Box Generation in AES by Changing Irreducible Polynomial," Communications, Devices and Intelligent Systems (CODIS), 2012 International Conference k IEEE, Dec. 28, 2012, pp. 556-559, XP032321711, DOI: 10.1109/CODIS.2012. 6422263 ISBN: 978-1-4673-4699-3.

Christopher A. Wood, et al., "Large Substitution Boxes with Efficient Combinational Implementations," Aug. 1, 2013, XP055564543, ISBN: 978-1-303-35216-4; Retrieved from the Internet: URL;https:// scholarworks.rit.edu/cgi/viewcontent.cgi?referer=https://www.google. com.&httpsredir+1&article=6531&context=theses[retrieved on Mar. 5, 2019] section 5.5 and chapter 6.

* cited by examiner

CUSTOMIZABLE ENCRYPTION/DECRYPTION ALGORITHM

FIELD

This document relates generally to cryptographic systems. More particularly, this document relates to cryptographic systems implementing a customizable encryption algorithm.

BACKGROUND

There are many cryptographic algorithms known in the art. One such cryptographic algorithm is described in U.S. Pat. No. 9,438,416 to Kurdziel ("Kurdziel"). The cryptographic algorithm implements a method that generally involves: combining a cryptographic key with state initialization bits to generate first combination bits; producing a first keystream by performing a permutation function $f$ using the first combination bits as inputs thereto; and using the first keystream to encrypt first data (e.g., authentication data or message body data) so as to produce first encrypted data (e.g., via modular arithmetic). The permutation function f comprises a round function $f_{round}$ that is iterated R times. The round function $f_{round}$ consists of (1) a substitution layer in which the first combination bits are substituted with substitute bits, (2) a permutation layer in which the substitute bits are re-arranged, (3) a mixing layer in which at least two outputs of the permutation layer are combined together, and (4) an addition layer in which a constant is added to the output of the mixing layer.

SUMMARY

The present disclosure concerns implementing systems and methods for customizing a cryptographic algorithm (e.g., an encryption algorithm and/or a decryption algorithm). The customization of the cryptographic algorithm does not cause any degeneration of its security. The methods comprise: providing an electronic device with the cryptographic algorithm implementing a permutation function $f$ configured to produce a first keystream using bits input thereto, the permutation function $f$ comprising a round function $f_{round}$ consisting of a mixing layer in which input bits are combined together; and customizing the mixing layer of the permutation function $f$ while the electronic device is in the field. The mixing layer is customized by: receiving, by the electronic device, a first user-software interaction for entering a first bit string comprising a plurality of first arbitrary bits; breaking the first bit string into a plurality of equal length segments each comprising only a portion of the plurality of first bits; translating each of the equal length segments into irreducible polynomial coefficients; and causing a respective one of a plurality of mixers comprising the mixing layer to use the irreducible polynomial coefficients.

In some scenarios, the methods further comprise: receiving a second user-software interaction for selecting a set of irreducible polynomial equations from a plurality of polynomial equations; and programming the selected set of irreducible polynomial equations for possible use by the mixers of the mixing layer. Each of the plurality of polynomial equations may comprise a degree-16 irreducible polynomial equation.

In those or other scenarios, the round function $f_{round}$ further consists of a substitution layer in which input bits are substituted with substitute bits. The bit substitutions of the substitution layer are performed by a plurality of customizable S-boxes. At least one S-box of the plurality of customizable S-boxes is customized by changing a polynomial equation and/or by changing an input-to-output bit mapping, such that the S-box: (1) has input values and output values that are all different; (2) does not have an output value that is equal to the corresponding input value; (3) does not have an output value that is a bitwise complement of the corresponding input value; (4) has a maximum differential probability of $2^{-14}$ or smaller; and (5) has a maximum linear bias of $2^{-8}$ or smaller. For example, the input-to-output bit mapping is changed by specifying values of at least one of a multi-bit invertible matrix A and a multi-bit vector b for the mathematical equation $S(x)=A \cdot x^{-1}+b$, where x is a multi-bit input. The values may be randomly selected in accordance with a chaotic, random or pseudo-random number algorithm. The same or different chaotic, random or pseudo-random number algorithm is used to specify values for the multi-bit invertible matrix A and the multi-bit vector b. The present solution is not limited to the particulars of this example.

In those or other scenarios, the round function $f_{round}$ further consists of a customizable permutation layer in which bits are rearranged. The customizable permutation layer is customized by changing a permutation formula such that the following criteria is met: (1) each output bit of a given S-box goes to a different mixer's input bit; (2) bit positions of bits input to the permutation layer are different than the positions of corresponding bits output from the permutation layer; and (3) an order of each bit position is greater than a number of rounds in a bijective function.

In those or yet other scenarios, the round function $f_{round}$ further consists of a customizable addition layer in which a constant is added to an output of the mixing layer. The customizable addition layer is customized by selecting a plurality of round constant values such that (1) there are no identifiable patterns in the plurality of round constant values and (2) the round constant values are different for each round. Each round constant value of the plurality of round constant values can have the same number of 0's and 1's, and/or be chosen at random.

DETAILED DESCRIPTION OF THE DRAWINGS

The present solution will be described with reference to the following drawing figures, in which like numerals represent like items throughout the figures.

DETAILED DESCRIPTION

Figure 1:
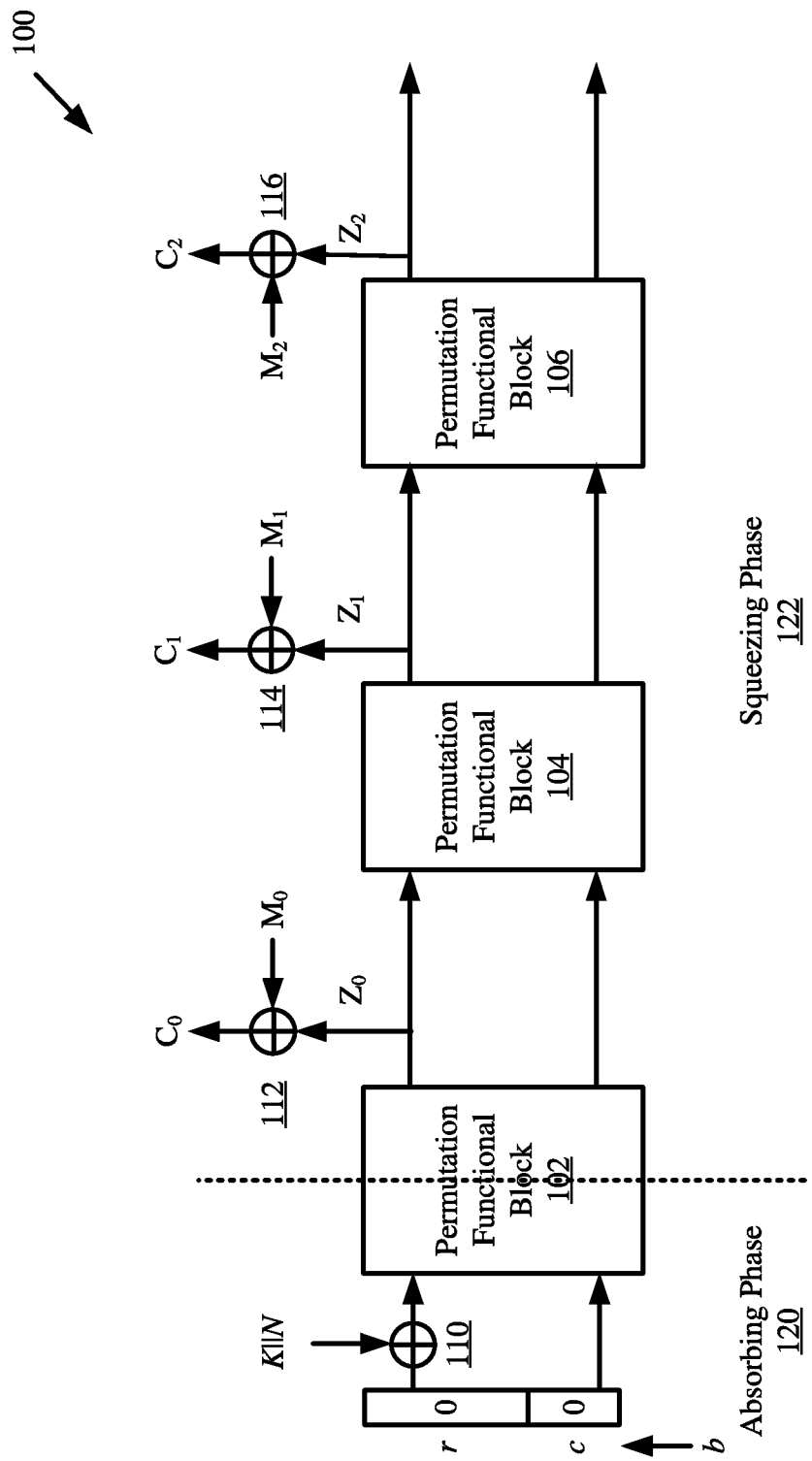
FIG. 1 is an illustration of an illustrative sponge construction employing a unique permutation function.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present solution may be embodied in other specific forms without departing from its spirit or essential characteristics. The described embodiments are to be considered in all respects only as illustrative and not restrictive. The scope of the present solution is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present solution should be or are in any single embodiment of the present solution. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One skilled in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

Reference throughout this specification to "one embodiment", "an embodiment", or similar language means that a particular feature, structure, or characteristic described in connection with the indicated embodiment is included in at least one embodiment of the present solution. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Sponge and duplex constructions provide frameworks representing new cryptographic paradigms with many advantages including processing performance and provable computational cryptographic strength. A novel cryptographic algorithm design is described herein that is based on the sponge and duplex construction frameworks. More particularly, the novel cryptographic algorithm comprises a unique permutation function $f$ that is used with a sponge construction and/or a duplex construction. In this regard, the present solution provides the same advantages of conventional sponge and duplex constructions, as well as other additional advantages. These other additional advantages include, but are not limited to: the provision of a highly configurable and customizable cryptographic algorithm; the provision of a symmetric key algorithm that is designed against a military threat model; the provision of increased throughput suitable to support high-rate networked waveforms; and the provision of an algorithm that can be used with key lengths that are longer than the key lengths which can be used with conventional cryptographic algorithms. Longer key lengths result in a higher level of security.

For military applications, the customers desire sovereign cryptography. Sovereign cryptography provides a feature called security autonomy where the customers have their own variant of a cryptographic algorithm. One way to obtain security autonomy is for the customers to specify their own cryptographic algorithm to be implemented in the device(s). This solution is not economically feasible. As such, the present solution provides a proprietary cryptographic algorithm that can be customized in various ways. The customization capability mainly lies in two types of customization, namely factory customization and field customization.

Factory customization is more substantial in terms of changing the cryptographic algorithms structure and adding new algorithm blocks, but also requires one to have the requisite expertise. One disadvantage of factory customization is that human error can cause degradation of the cryptographic system. This disadvantage is addressed by the present solution. In this regard, the present solution employs a cryptographic (e.g., encryption and/or decryption) algorithm that can be customized without any degradation to the security thereof. Another disadvantage is that some customers do not want others (i.e., the people with the requisite expertise) to have knowledge of their own variant of a cryptographic algorithm. The present solution also addressing this disadvantage by providing a cryptographic algorithm that can be customized in the field.

Field customization allows customers to make changes to the cryptographic algorithm via a tool after the device is provided to them. All possible information that can be input into the system via the tool to provide the field customization are equally valid in terms of not degrading the cryptographic strength of the cryptographic algorithm.

Accordingly, the present solution has two levels of customization. A first Custom Crypto ("CC") capability allows customized versions of the sponge based cryptographic algorithm to be embedded in a device (e.g., a handheld radio) at the factory. There are a number of CC settings that are specified for a custom version of the sponge based cryptographic algorithm, after an analysis to ensure that it is secure. The CC settings are stored and loaded into the encryption/decryption circuitry at power-on. The CC capability can be implemented in a substitution layer, a permutation layer and/or a round constant addition layer of a permutation function $f$, as discussed below.

A second Custom Algorithm Modification ("CAM") capability allows a user to customize the encryption/decryption algorithm in the field after power-on (i.e., after the device employing the cryptographic algorithm has been provided to the customer). CAM settings are stored in an N-bit (e.g., 128 bit) register that can be changed at any time (except during encryption/decryption). All possible CAM register values must yield different, fully secure customized algorithms. CAM is implemented in a mixer layer of the permutation function $f$. The CC and CAM capabilities will be described in detail below.

The present solution also has the following additional advantages: increased processing performance and provable computational cryptographic strength; cost effective alternative to embedded sovereign cryptography; includes cryptographic constructs and key lengths to provide post quantum security in a reasonable hardware and software footprint; and designed against a military threat model.

Referring now to FIG. 1, there is provided a schematic illustration of an illustrative architecture for a sponge construction 100 implementing the present solution. Notably, the sponge construction 100 uses a unique permutation function $f$ (described below) to provide the traditional suite of cryptographic modes. This will become more evident as the discussion progresses.

As shown in FIG. 1, the sponge construction 100 is generally designed to implement symmetric cryptography functionalities, namely key derivation and message encryption/decryption. The sponge construction 100 is a simple iterated construction for building a function F based on a unique permutation function $f$. The function F has a variable-length input and an arbitrary output length. The unique permutation function $f$ operates on a state of b=r+c bits, where r (e.g., 128 bits) is the bitrate and c (e.g., 384 bits) is the capacity. The capacity c determines the security level of the sponge construction.

Notably, the sponge construction 100 can be implemented in hardware, software or a combination of both hardware and software. As such, the operations of each functional block 102-106 may be implemented using hardware and/or software. The hardware can include, but is not limited to an electronic circuit. The electronic circuit can include passive components, active components and logical components.

The sponge construction 100 is divided into two phases. The first phase is an absorbing phase 120 in which the cryptographic key K or K∥N (i.e., a concatenation of the cryptographic key K and a flag N) is absorbed into a state of the sponge construction 100 while interleaving with applications of the underlying permutation function $f$. Such absorption is achieved by combining K (or K∥N) with the first r bits of the initialized state bits b. In some scenarios, the bits b (e.g., 512 bits) are initialized to zero. The present solution is not limited in this regard. The bits b (e.g., 512 bits) may alternatively be initialized to any bit value (e.g., any 512 bit value). As such, each user could generate its own unique value to set during the initialization phase.

The combining of K (or K∥N) with the first r bits of the initialized state can be achieved via exclusive OR ("XOR") operations 110, as shown in FIG. 1. XOR operations are well known in the art, and therefore will not be described in detail here. Still, it should be understood that the XOR operations are performed on a bit-by-bit basis. The result of each XOR operation is true whenever an odd number of inputs are true and false whenever an even number of inputs are true. The results of the XOR operations are then passed to permutation functional block 102 where the results are interleaved with applications of the unique permutation function $f$.

The second phase is a squeezing phase 122 in which keystream blocks $Z_0$, $Z_1$, $Z_2$ are produced by the performance of the unique permutation function $f$ in permutation functional blocks 102-106. Each keystream block $Z_0$, $Z_1$, $Z_2$ comprises r bits. The unique permutation function $f$ will be described in detail below. Still, it should be understood that the permutation function $f$ maps each possible value of the bits input thereto into a particular unique value of the output bits. Notably, permutation functional block 102 takes the output of the absorbing phase 120 as an input. Permutation functional block 104 takes the output of permutation functional block 102 as an input. Permutation functional block 106 takes the output of permutation functional block 104 as an input.

Next, the keystream blocks $Z_0$, $Z_1$, $Z_2$ are used to encrypt a message M. In this regard, the keystream blocks $Z_0$, $Z_1$, $Z_2$ can be truncated to a desired length l. Additionally or alternatively, the message M may be padded to make it a multiple of r (if it is not a multiple of r). The message M is parsed into a plurality of message blocks $M_0$, $M_1$, $M_2$. Each message block $M_0$, $M_1$, $M_2$ comprises a plurality of bits of the message M. Each keystream block is then combined with a respective message block so as to produce an encrypted data block. The encrypted data block can include, but is not limited to, a ciphertext block $C_0$, $C_1$ or $C_2$. The present solution is described herein in relation to ciphertext. The present solution is not limited in this regard. The present solution can be used to encrypt any type of data (e.g., text, audio, video, etc. . . . ).

In some scenarios, the combining of the keystream and message blocks is achieved using modular arithmetic. For example, each keystream block $Z_0$, $Z_1$, $Z_2$ is combined with a respective block of message bits $M_0$, $M_1$, $M_2$ via modulo 2 addition. The modulo 2 addition can be implemented using an XOR operation, as shown in FIG. 1. The XOR operation is performed on a bit-by-bit basis. As such, a first bit $m_0$ of a message block $M_0$, $M_1$ or $M_2$ is combined with a first bit $z_0$ of a respective keystream block $Z_0$, $Z_1$ or $Z_2$ via modulo 2 addition. Next, a second bit $m_1$ of a message block $M_0$, $M_1$ or $M_2$ is combined with a first bit $z_1$ of a respective keystream block $Z_0$, $Z_1$ or $Z_2$ via modulo 2 addition, and so on.

Figure 2:
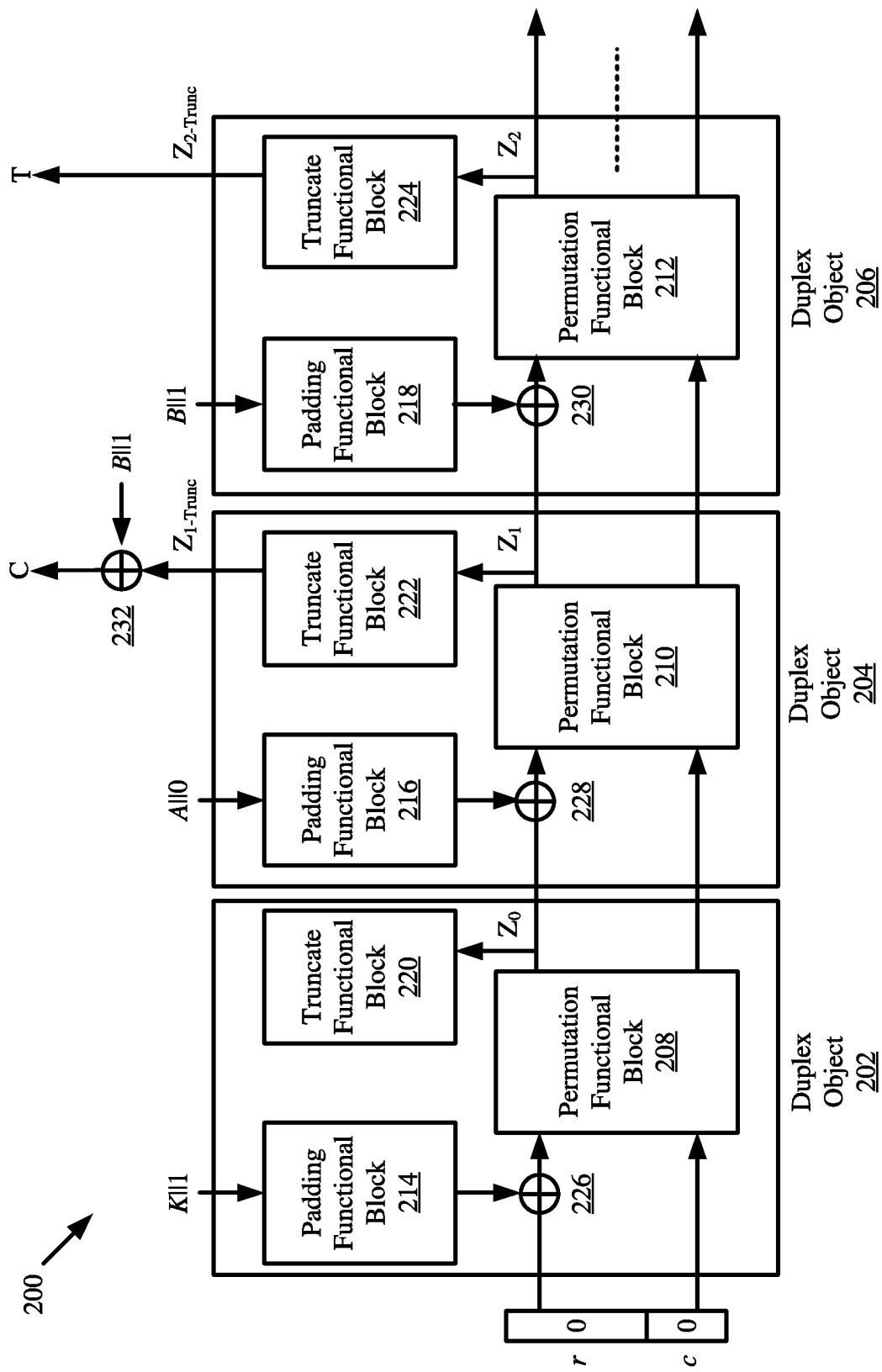
FIG. 2 is an illustration of an illustrative duplex construction employing a unique permutation function.

Referring now to FIG. 2, there is provided a schematic illustration of an illustrative architecture for a duplex construction 200 implementing the present solution. The duplex construction 200 is an adaptation of the sponge construction framework that, together with the unique permutation function $f$ (described below), provides an additional Authenticated Encryption ("AE") cryptographic mode. This mode allows both source and integrity verification of encrypted traffic. This will become more evident as the discussion progresses.

Notably, the duplex construction 200 can be implemented in hardware, software or a combination of both hardware and software. As such, the operations of each component 202-232 may be implemented using hardware and/or software. The hardware can include, but is not limited to an electronic circuit. The electronic circuit can include passive components, active components and logical components.

In the duplex construction 200, the absorbing phase and squeezing phase are combined into each of a plurality of duplex operations. Accordingly, the duplex construction 200 comprises a plurality of duplex objects 202-206. The operations of each duplex object will be described separately below. Notably, the state of each duplex object call is preserved.

The input to duplex object 202 is a cryptographic key K (or optionally K∥1, i.e. a concatenation of the cryptographic key K and a flag 1). The cryptographic key K (or optionally K∥1) is padded in padding functional block 214 to make it a multiple of r (if it is not a multiple of r). The padding can involve appending bits to the beginning or end of the cryptographic key K (or optionally K∥1). Next, the output of padding functional block 214 is then combined with the first r bits of the initialized state bits b. In some scenarios, the bits b are initialized to zero, where b=r+c. The present solution is not limited in this regard. The bits b (e.g., 512 bits) may alternatively be initialized to any bit value (e.g., a 512 bit value). As such, each user could generate its own unique value to set during the initialization phase.

The combining of the padding functional block output and the first r bits of the initialized state can be achieved via XOR operations 110, as shown in FIG. 1. XOR operations are well known in the art, and therefore will not be described in detail here. Still, it should be understood that the XOR operations are performed on a bit-by-bit basis. The results of the XOR operations are then passed to permutation functional block 208. In permutation functional block 208, the unique permutation function $f$ is performed using the results of the XOR operations as inputs so as to generate a keystream block $Z_0$. The keystream block $Z_0$ is then truncated to a desired length l, as shown by truncate functional block 220. The value of l here can be less than r.

The input to duplex object 204 is authentication data A (or optionally A∥0, i.e. a concatenation of authentication data A and a flag 0). The authentication data A can include but is not limited to, authenticated packet headers. The authentication data A (or optionally A∥0) is padded in padding functional block 216 to make it a multiple of r (if it is not a multiple of r). The padding of padding functional block 216 is the same as or similar to that of padding functional block 214. Next, the output of padding functional block 216 is then combined with keystream block $Z_0$. This combining can be achieved via XOR operations 228, as shown in FIG. 2. XOR operations are well known in the art, and therefore will not be described in detail here. Still, it should be understood that the XOR operations are performed on a bit-by-bit basis. The results of the XOR operations are then passed to permutation functional block 210. In permutation functional block 210, the unique permutation function $f$ is performed so as to generate a keystream block $Z_1$. The keystream block $Z_1$ is then optionally truncated to a desired length l, as shown by truncate functional block 222. The value of l here can be less than r. Truncation may be performed when the number of bits contained in the message body B is less than r. In this case, the value of l equals the number of bits contained in the message body B. The truncated keystream block $Z_{1\text{-}Trunc}$ is output from duplex object 204.

Thereafter, the truncated keystream block $Z_{1\text{-}Trunc}$ is combined with a message body B (or optionally B∥1, i.e. a concatenation of message body B and a flag 1). The message body B can include, but is not limited to, packet payload. This combining is achieved via XOR operations 232, which produces encrypted data (e.g., ciphertext) C. The XOR operations 232 are performed on a bit-by-bit basis.

The input to duplex object 206 is message body data B (or optionally B∥1). The message body data B can include but is not limited to, packet payload data. The message body data B (or optionally B∥1) is padded in padding functional block 218 to make it a multiple of r (if it is not a multiple of r). The padding of padding functional block 218 is the same as or similar to that of padding functional blocks 214 and 216. Next, the output of padding functional block 218 is then combined with keystream block $Z_1$. This combining can be achieved via XOR operations 230, as shown in FIG. 2. XOR operations are well known in the art, and therefore will not be described in detail here. Still, it should be understood that the XOR operations are performed on a bit-by-bit basis. The results of the XOR operations are then passed to permutation functional block 212. In permutation functional block 212, the unique permutation function $f$ is performed so as to generate a keystream block $Z_2$. The keystream block $Z_2$ is then optionally truncated to a desired length l, as shown by truncate functional block 224. The value of l here can be less than r. The truncated keystream block $Z_{2\text{-}Trunc}$ is output from duplex object 204. The truncated keystream block $Z_{2\text{-}Trunc}$ is then used as an authentication tag T.

In a communications scenario, the encrypted data (e.g., ciphertext) C and the authentication tag T would be transmitted from a source communication device to a destination communication device. The cryptographic key K would not be transmitted since it would be known by both devices.

The advantages of the duplex construction 200 are that: a single cryptographic key is required; encryption and authentication requires only a single pass; intermediate tags are supported thereby; additional authentication data (e.g., packet headers) is supported thereby; it is secure against generic attacks; and the ability to trade off speed and security by adjusting the value of r.

Figure 3:
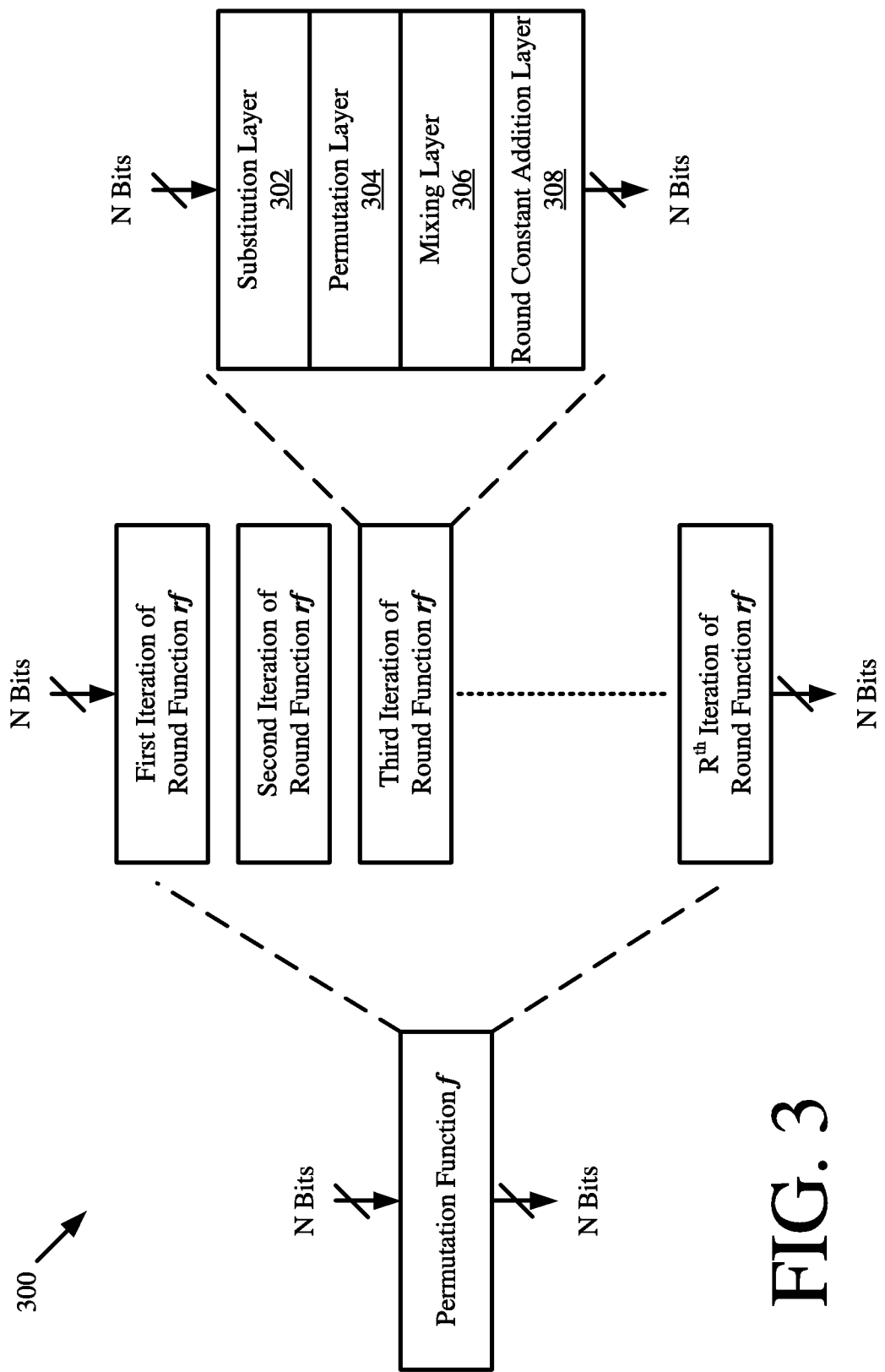
FIG. 3 is an illustration that is useful for understanding the unique permutation function $f$.

Referring now to FIG. 3, there is provided a schematic illustration that is useful for understanding the unique permutation function $f$ of the present solution which is employed in the sponge and duplex constructions described above in relation to FIGS. 1-2. The permutation function $f$ supports any key size (e.g., 128 bits or 256 bits) and is bijective. Since the permutation function $f$ is bijective, $f^{-1}$ (inverse of f) exists by definition. While $f^{-1}$ is not used in practice, it may be helpful for crypto-analysis and verification purposes. Notably, the number of bits that are input and/or output from the permutation function $f$ is also customizable.

The permutation function $f$ comprises a round function $f_{round}$ that is iterated R times, depending on the key size. The round function $f_{round}$ consists of the following layers: a substitution layer 302; a permutation layer 304; a mixing layer 306; and a round constant addition layer 308. In the substitution layer 302, the bits input thereto are substituted with first substitute bits in accordance with a particular transformation and/or mapping algorithm. For example, input bits 010001 are substituted with bits 1010. The number of bits input/output to/from the substitution layer 302 can be the same or different. In the permutation layer 304, the bits input thereto are re-arranged. In the mixing layer 306, at least two outputs of the permutation layer are combined together. In the round constant addition layer 308, a constant is added to the output of the mixing layer. The manners in which the operations of each layer 302-308 are achieved will be discussed in detail below.

Notably, R is an integer which has a value large enough to resist differential attacks, linear attacks and other attacks depending on the cryptographic key size (e.g., R=10 for a 128 bit key or R=16 for a 256 bit key). In this regard, R is a customizable element of the permutation function $f$. In some scenarios, R is determined by (1) calculating the number of rounds needed for linear and differential crypto-analysis and (2) adding some buffer to increase the security margin.

Figure 4:
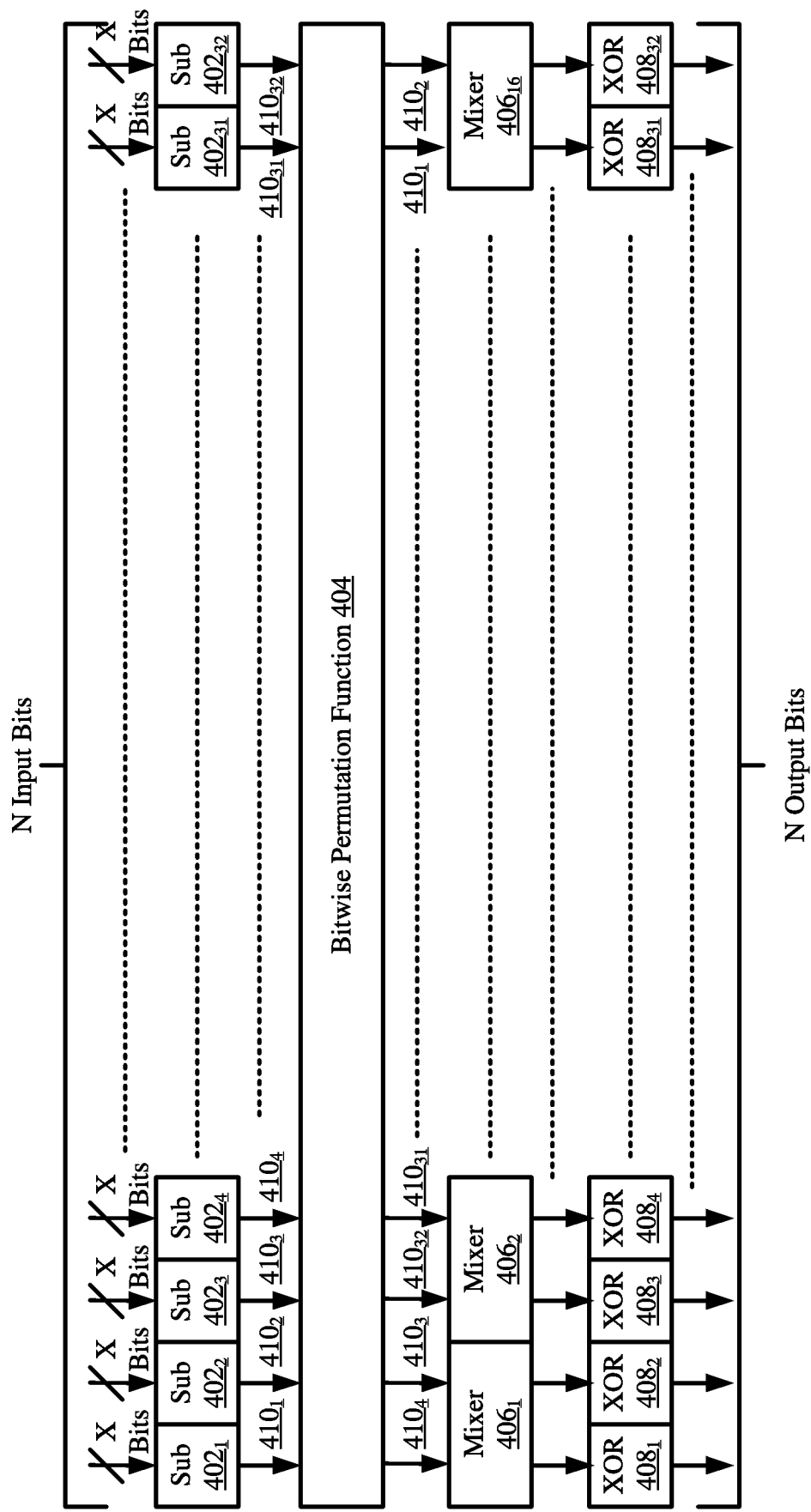
FIG. 4 is an expanded block diagram of the round function $f_{round}$ shown in FIG. 3.

Referring now to FIG. 4, there is provided an expanded block diagram of the round function $f_{round}$. The substitution layer 302 comprises a plurality of identical substitution boxes (or S-boxes) $402_1, 402_2, 402_3, 402_4, \ldots, 402_{31}, 402_{32}$ which collectively receive N input bits (e.g., 512 input bits) and individually receive X bits of the N input bits (e.g., 16 bits of 512 input bits). The value of N is selected to be large enough to keep a cryptographic key secure. For example, the value of N is selected to be 512 bits for a cryptographic key having a size of 128 bits or 256 bits.

The purpose of the S-boxes is to perform substitution so as to obscure the relationship between the cryptographic key and encrypted data (e.g., ciphertext). S-boxes are well known in the art, and therefore will not be described in detail herein. Any known or to be known S-box can be used herein without limitation provided that the following properties are satisfied thereby.

(1) The S-boxes have small differential probabilities.
(2) The S-boxes have small linear approximation biases.
(3) The S-boxes have a customizable number of input bits X.
(4) The S-boxes have customizable mapping functions.

For example, each S-box $402_1$, $402_2$, $402_3$, $402_4$, ..., $402_{31}$, $402_{32}$ comprises an X-bit-to-X-bit S-box or an X-bit-by-Y-bit S-box, where X is a customizable integer and Y is a customizable integer different from X. The S-boxes can be implemented as look-up tables or in hardware using logical gates (e.g., XOR gates and AND gates). The look-up tables can be fixed or dynamically generated using the cryptographic key.

In some scenarios, each S-box comprises a bijective 16-bit-to-16-bit S-box. An illustrative architecture for such an S-box is described in Appendix C of a document entitled "Large Substitution Boxes with Efficient Combinational Implementations" which was written by Wood and published in August 2013. Each S-box of the substitution layer 302 is computed by the following mathematical equation.

$$S(x) = A \cdot x^{-1} + b$$

where x is a multi-bit input (e.g., a 16 bit input), A is a multi-bit invertible matrix (e.g., a 16×16-bit invertible matrix), and b is a multi-bit matrix (e.g., a 16 bit matrix). Input x is an element of a finite field $GF(2^{16})/p(x)$, where $p(x)$ is the irreducible polynomial $x^{16}+x^5+x^3+x+1$. $x^{-1}$ is then treated as a 16-bit vector, and the affine transformation $A \cdot x^{-1} + b$ is computed yielding a 16-bit output $S(x)$.

In this regard, the input to the S-box is represented as a 16-bit column vector $x = (x_{15}\ x_{14}\ \ldots\ x_1\ x_0)^T$, $x_{15}$ is the most significant bit. Using this notation, the forward S-box function is re-written as follows.

$$Y = S(X) =$$

$$\begin{bmatrix} 0 & 0 & 1 & 0 & 0 & 0 & 0 & 1 & 0 & 0 & 1 & 1 & 1 & 1 & 1 & 0 \\ 1 & 1 & 0 & 0 & 0 & 0 & 0 & 1 & 0 & 1 & 1 & 0 & 1 & 0 & 1 & 0 \\ 1 & 1 & 0 & 0 & 1 & 0 & 1 & 1 & 0 & 1 & 0 & 1 & 0 & 0 & 1 & 1 \\ 1 & 1 & 1 & 0 & 0 & 0 & 1 & 0 & 0 & 1 & 1 & 0 & 0 & 0 & 0 & 0 \\ 1 & 1 & 0 & 0 & 0 & 1 & 1 & 0 & 0 & 1 & 1 & 1 & 1 & 0 & 1 & 1 \\ 0 & 1 & 0 & 0 & 0 & 0 & 1 & 1 & 0 & 1 & 1 & 1 & 1 & 1 & 0 & 1 \\ 0 & 0 & 1 & 0 & 1 & 0 & 1 & 0 & 1 & 1 & 0 & 0 & 1 & 1 & 0 & 0 \\ 1 & 0 & 1 & 1 & 1 & 0 & 1 & 1 & 0 & 0 & 0 & 1 & 0 & 1 & 1 & 1 \\ 0 & 1 & 0 & 0 & 0 & 0 & 0 & 1 & 0 & 0 & 1 & 1 & 1 & 0 & 1 & 1 \\ 1 & 0 & 1 & 1 & 0 & 0 & 0 & 1 & 0 & 0 & 1 & 0 & 1 & 0 & 0 & 0 \\ 1 & 0 & 1 & 0 & 0 & 1 & 1 & 1 & 0 & 0 & 1 & 1 & 0 & 1 & 0 & 0 \\ 1 & 0 & 1 & 1 & 1 & 0 & 1 & 1 & 1 & 0 & 1 & 1 & 0 & 0 & 1 \\ 1 & 0 & 1 & 0 & 0 & 1 & 0 & 1 & 1 & 0 & 0 & 1 & 0 & 0 & 0 & 1 \\ 0 & 1 & 0 & 0 & 0 & 1 & 1 & 1 & 1 & 0 & 0 & 0 & 0 & 0 & 0 & 1 \\ 1 & 0 & 0 & 0 & 1 & 1 & 0 & 1 & 0 & 1 & 1 & 1 & 1 & 0 & 0 & 0 \\ 1 & 1 & 0 & 1 & 0 & 1 & 1 & 0 & 1 & 0 & 0 & 1 & 1 & 0 & 0 & 0 \end{bmatrix} \begin{pmatrix} x_{15} \\ x_{14} \\ x_{13} \\ x_{12} \\ x_{11} \\ x_{10} \\ x_9 \\ x_8 \\ x_7 \\ x_6 \\ x_5 \\ x_4 \\ x_3 \\ x_2 \\ x_1 \\ x_0 \end{pmatrix}^{-1} \oplus \begin{pmatrix} 0 \\ 1 \\ 0 \\ 0 \\ 0 \\ 1 \\ 0 \\ 1 \\ 1 \\ 0 \\ 1 \\ 1 \\ 0 \\ 1 \\ 1 \\ 1 \end{pmatrix}$$

The inverse of the S-box function is defined by the following mathematical equation.

$$X = S^{-1}(Y) =$$

$$\begin{bmatrix} 0 & 1 & 0 & 1 & 0 & 1 & 1 & 1 & 0 & 0 & 1 & 0 & 0 & 0 & 0 & 1 \\ 1 & 1 & 0 & 1 & 0 & 0 & 1 & 0 & 1 & 0 & 1 & 1 & 1 & 1 & 0 & 1 \\ 1 & 0 & 1 & 1 & 1 & 1 & 0 & 1 & 0 & 1 & 1 & 0 & 0 & 0 & 0 & 0 \\ 0 & 0 & 1 & 0 & 1 & 1 & 1 & 0 & 1 & 0 & 1 & 1 & 1 & 0 & 1 & 0 \\ 1 & 1 & 1 & 1 & 1 & 0 & 0 & 0 & 1 & 0 & 0 & 0 & 0 & 1 & 0 & 0 \\ 0 & 0 & 0 & 1 & 0 & 1 & 0 & 0 & 0 & 0 & 1 & 1 & 1 & 1 & 1 & 1 \\ 1 & 0 & 1 & 0 & 0 & 0 & 0 & 0 & 0 & 1 & 1 & 0 & 1 & 0 & 1 & 1 \\ 0 & 0 & 1 & 0 & 1 & 1 & 1 & 0 & 0 & 1 & 0 & 1 & 1 & 1 & 1 & 0 \\ 0 & 0 & 0 & 0 & 0 & 1 & 0 & 0 & 0 & 1 & 0 & 0 & 0 & 0 & 1 & 0 \\ 1 & 1 & 1 & 0 & 0 & 1 & 1 & 1 & 1 & 0 & 1 & 1 & 1 & 0 & 0 & 0 \\ 0 & 1 & 1 & 0 & 1 & 1 & 1 & 1 & 0 & 0 & 1 & 0 & 1 & 1 & 1 & 1 \\ 1 & 0 & 0 & 1 & 1 & 0 & 0 & 0 & 1 & 0 & 0 & 1 & 1 & 0 & 1 & 1 \\ 1 & 0 & 0 & 0 & 0 & 1 & 0 & 1 & 1 & 1 & 0 & 0 & 1 & 0 & 1 & 0 \\ 1 & 0 & 0 & 0 & 0 & 1 & 1 & 1 & 1 & 1 & 0 & 1 & 1 & 1 & 1 & 1 \\ 1 & 1 & 1 & 0 & 0 & 1 & 1 & 0 & 1 & 0 & 0 & 1 & 1 & 1 & 1 & 1 \\ 0 & 1 & 0 & 0 & 1 & 0 & 1 & 0 & 1 & 0 & 0 & 1 & 0 & 0 & 0 & 1 \end{bmatrix} \begin{pmatrix} y_{15} \\ y_{14} \oplus 1 \\ y_{13} \\ y_{12} \\ y_{11} \\ y_{10} \oplus 1 \\ y_9 \\ y_8 \oplus 1 \\ y_7 \oplus 1 \\ y_6 \\ y_5 \oplus 1 \\ y_4 \oplus 1 \\ y_3 \\ y_2 \oplus 1 \\ y_1 \oplus 1 \\ y_0 \oplus 1 \end{pmatrix}^{-1}$$

The above-described S-box can be implemented in hardware using 1238 XOR gates and 144 AND gates.

The S-box is customizable by changing the polynomial p(x). The polynomial can be changed by inputting a new polynomial or selecting a polynomial from a plurality of pre-programmed polynomials. In the latter case, the polynomial can be randomly selected from the plurality of pre-programmed polynomials. The random selection can be achieved in accordance with a chaotic, random or pseudo-random number algorithm. Chaotic, random and pseudo-random number algorithms are well known in the art, and therefore will not be described herein. Any known or to be known chaotic, random or pseudo-random number algorithm can be used herein without limitation.

Additionally or alternatively, the S-box is customizable by specifying values of the invertible matrix A and/or the vector b, such that the S-box meets the following criteria.

Input values of the S-box and the output values of the S-box are all different, where $S(x) \neq x$.

No output value is equal to the corresponding input value.

No output value is a bitwise complement of the corresponding input value.

Maximum differential probability of $2^{-14}$ or smaller. (Meaning that in theory the amount of work one must do to determine the mapping from input values to output values of the S-box is significantly greater than the time needed for a brute force determination of the key in a given number of rounds.)

Maximum linear bias of $2^{-8}$ or smaller. (Meaning that in theory an attack based on the linear bias of the S-box is not going to be successful if the linear bias has a value less than or equal to $2^{-8}$.)

The above-listed criteria are considered to provide a relatively strong cryptographic algorithm in which standard classical attacks are unlikely to be successful. Other criteria can be considered here. However, the present inventors found through significant research that the above-listed criteria provides a cryptographic algorithm with sufficient strength for military applications. These criteria advantageously address issues with key search attacks without any knowledge of the algorithms implementation and key search attacks using knowledge of at least one feature of the implemented cryptographic algorithm.

In some scenarios, the values of the invertible matrix A and/or the vector b are selected randomly. This selection is achieved by selecting values thereof in accordance with a chaotic, random or pseudo-random number algorithm. Any known or to be known chaotic, random or pseudo-random number algorithm can be used herein without limitation.

For example, in some scenarios, a user performs a user-software interaction to select at least one of a plurality of chaotic, random or pseudo-random algorithms that is to be used to generate values for the invertible matrix A and/or the vector b. The same or different algorithm can be used to generate numbers for the invertible matrix A and the vector b. The user may also enter or select values for parameters of the selected chaotic, random or pseudo-random algorithm(s). The present solution is not limited to the particulars of this example.

The present solution is also not limited to the particulars of the above discussion. In this regard, it should be understood that any S-box configuration can be employed where there is an N bit input (e.g., 16 bit) to an N bit output (e.g., 16 bit) mapping that meets the above listed criteria. For example, in other scenarios, the present solution is implemented using four 4-bit mappings, rather than one 16-bit to 16-bit mapping.

The permutation layer 304 comprises a bitwise permutation function 404. The purpose of the bitwise permutation function 404 is to permute or change a bit position of each bit $410_1, 410_2, 410_3, 410_4, \ldots, 410_{31}, 410_{32}$ input thereto relative to all other bits input thereto. Bitwise permutation functions are well known in the art, and therefore will not be described in detail herein. Any known or to be known bitwise permutation function can be used herein without limitation provided that the following properties are satisfied thereby.

(1) Each bit $410_1, 410_2, 410_3, 410_4, \ldots, 410_{31}, 410_{32}$ permutes to an output bit position different from its input bit position.
(2) All outputs of a given S-box go to X different mixers.
(3) The permutation period of the permutation function $f$ exceeds the number of rounds R.

For example, the bitwise permutation function includes a linear permutation function, an affine permutation function, or a random permutation function.

In some scenarios, the bitwise permutation function 404 comprises an affine function defined by the following mathematical equation.

$$\pi(x) = \alpha x + \beta \pmod{512}$$

where $\pi(x)$ represents the output bit position ($\pi(x) \leq 511$), $\alpha$ is an integer constant (e.g., 31), x represents the input bit position ($0 \leq x$), and $\beta$ is an integer constant (e.g., 15).

The bitwise permutation function 404 is customized by changing the permutation formula, but meeting the following criteria.
   Each output bit of a given S-box must go to a different mixer's input bit.
   The permutation has no fixed points, where $\pi(x) = x$ (i.e., bit positions of the input bits are different than the corresponding output bit positions).
   The order of each bit position must be greater than the number of rounds in the bijective function.

The listed criteria are considered to provide a relatively strong cryptographic algorithm in which standard classical attacks are unlikely to be successful. The strength of the algorithm is facilitated here by ensuring that (a) the output bit string is different from the input bit string and (b) that there are a relatively large number of bit changes between the input bit string and the output bit string. Other criteria can be considered here. However, the present inventors found through significant research that the above listed criteria provided a cryptographic algorithm with sufficient strength for military applications. These criteria advantageously address issues with key search attacks without any knowledge of the algorithms implementation and key search attacks using knowledge of at least one feature of the implemented.

A plurality of permutation formulas which meet the above criteria are described in a thesis document entitled "Design and Cryptoanalysis of a Customizable Authenticated Encryption Algorithm", written by Kelly. Any of the permutation functions mentioned in this thesis can be used herein without limitation. For example, the above-described permutation function is changed to one of the following permutation functions which meet the above criteria.

$$pi(x) = 31x + 15$$

$$pi(x) = 31x + 31$$

$$pi(x) = 33x + 16$$

$$pi(x) = 33x + 48$$

Customization can be achieved by either selecting one of a plurality of predefined and/or preprogrammed permutation functions or by allowing a customer to enter their own unique permutation formula.

The present solution is not limited to the particulars of the permutation formulas referenced above. Any permutation technique can be used here provided that the above listed three criteria are met.

The mixing layer 306 comprises a mixing function that is implemented via a plurality of mixers $406_1, 406_2, \ldots, 410_{16}$. In the scenario shown in FIG. 4, one mixer is provided for every two S-boxes. The present solution is not limited in this regard. The particular number of S-boxes per mixer is customizable. Also, the mixing function is a customizable element of the present solution. The purpose of the mixing function is to provide local diffusion (i.e., across two words) and increase the linear and differential branch numbers of a round from two to three. In this regard, mixers based on matrix multiplication in Galois Field $GF(2^M)$ may be employed because they satisfy all of the following constraints: the matrix is invertible in $GF(2^{16})/<p(x)>$; the matrix has a differential and linear branch number equal to three; and the transformation is efficiently implementable in hardware.

In some scenarios, operations performed by each mixer $406_1, 406_2, \ldots, 410_{16}$ is defined by the following mathematical equation.

$$p(x) = x^{16} + x^5 + x^3 + x^2 + 1$$

The mixer takes in two words $W_1$ and $W_2$ as input and produces outputs $W'_1$ and $W'_2$ as follows.

$$\begin{pmatrix} W'_1 \\ W'_2 \end{pmatrix} = \begin{pmatrix} 1 & x \\ x & x+1 \end{pmatrix} \begin{pmatrix} W_1 \\ W_2 \end{pmatrix}$$

Figure 5:
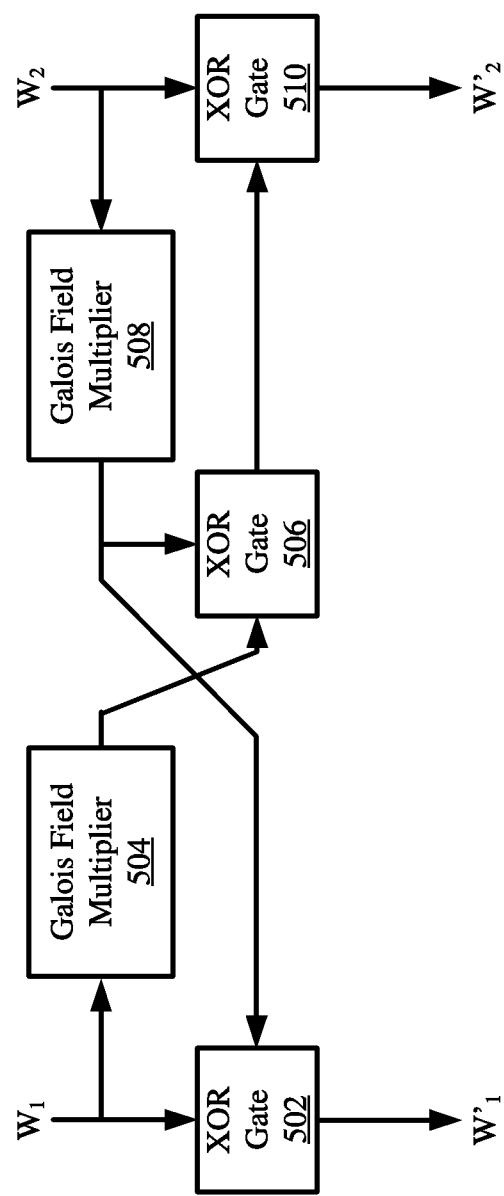
FIG. 5 is a schematic illustration of an illustrative hardware implementation of a mixer.

The mixer is implementable in hardware. An illustrative hardware implementation of the mixer is provided in FIG. 5. As shown in FIG. 5, the mixer comprises XOR gates 502, 506, 510 and Galois field multipliers 504, 508. The Galois field multipliers 504, 508 perform multiplication by x in Galois field $GF(2^x)$.

The mixing layer 306 is customizable based on user input. As noted above, each mixer in the mixing layer 306 has two 16-bit input words $W_1$, $W_2$ and two 16-bit output words $W'_1$, $W'_2$. In the mixing layer 306, arithmetic in Galois field $GF(2^{16})/p(x)$ is performed using a certain degree-16 irreducible polynomial p(x). Each 16-bit quantity is treated as a vector of coefficients of a polynomial in x, from $x^{15}$ down to $x^0$. Addition and multiplication are performed on polynomials using GF(2) arithmetic on the coefficients. Every result is reduced modulo p(x). A 128-bit CAM register setting is used to specify a particular irreducible polynomial p(x) used in each mixer. There are sixteen mixers $406_1, \ldots, 406_{16}$ so there are eight CAM register bits per mixer. The eight CAM register bits are used to select a predefined irreducible polynomial from a given pre-programmed set of irreducible polynomials (e.g., 256). In this regard, a user inputs a bit string of 128 bits (i.e., 8 bits by 16 mixers). The bit string is then processed to parse out sixteen segments each comprising eight bits. Each segment is converted or translated into irreducible polynomial coefficient values and/or an identifier for a particular irreducible polynomial of the pre-programmed set. The identifier can comprise (1) information identifying the particular irreducible polynomial and/or (2) information indicating where the particular irreducible polynomial of the pre-programmed set is stored in a data store (e.g., memory 812 of FIG. 8) local to the electronic device implementing the cryptographic algorithm. A table lookup can be used here to perform the bit-to-coefficient conversion/translation and/or the bit-to-identifier conversion/translation.

Notably, there are 4,080 different 16-degree irreducible polynomials that meet the above-listed criteria. The set of irreducible polynomials (e.g., 256) is selected at the factory from the 4,080 different 16-degree polynomials. Accordingly, a different set of irreducible polynomials (e.g., 256) can be selected for each customer to achieve customization of the cryptographic algorithm, i.e., a new set of predefined irreducible polynomials (e.g., 256) can be from the 4,080 different 16-degree polynomials for each customer.

In some scenarios, at least two of the mixers use the same irreducible polynomial, but with different coefficients. Additionally or alternatively, the bit string is entered by the user in the field. The bit string includes arbitrary bits. The user has no expertise with regard to cryptography. Still, the user is able to change the encryption/decryption algorithm without causing any degradation to the security thereof.

The round constant addition layer 308 comprises a plurality of addition operations represented by blocks $408_1$, $408_2$, $408_3$, $408_4$, $\ldots$, $408_{31}$, $408_{32}$. The purpose of the addition operations is to add a constant N bit value to the state using bitwise XOR in order to disrupt symmetry and prevent slide attacks. Notably, the round constant must be fixed random N-bit values. Each round i must use a different round constant. The round constant is customizable, and should be unique for each round to prevent against slide attacks and be random, pseudorandom or highly asymmetric to reduce symmetry in the state. Accordingly, the round constant addition layer 308 is customizable by simply choosing different round constants, but meeting the following criteria.

The round constants must be chosen such that there are no identifiable patterns in a plurality of round constant values.

The round constant values are different for each round. In some scenarios, at least one of the following criteria may additionally be met.

Each round constant has the same number of 0's and 1's.
Each round constant is chosen at random.
A round constant can be chosen at random in accordance with a chaotic, random or pseudo-random number algorithm. Chaotic, random and pseudo-random number algorithms are well known in the art, and therefore will not be described herein. Any known or to be known chaotic, random or pseudo-random number algorithm can be used herein without limitation.

In some scenarios, the round constant $RC_i$ for round i is given by the following mathematical equation.

$$RC_i = \text{KECCAK-N}(\text{ASCII}(i))$$

where ASCII(i) is a function that provides a one or two byte ASCII representation of round i and KECCAK-512 is the hash function that outputs an N (e.g., 512) bit message digest. The following TABLE 1 provides the values of the round constant $RC_i$ up to i=16.

TABLE 1

| Constant | Hex Value |
| --- | --- |
| $RC_1$ | 00197a4f5f1ff8c356a78f6921b5a6bfbf71df8dbd313fbc5095a55de756bfa1 ea7240695005149294f2a2e419ae251fe2f7dbb67c3bb647c2ac1be05eec7ef9 |
| $RC_2$ | ac3b6998ac9c5e2c7ee8330010a7b0f87ac9dee7ea547d4d8cd00ab7ad1bd5f5 7f80af2ba711a9eb137b4e83b503d24cd7665399a48734d47fff324fb74551e2 |
| $RC_3$ | ce4fd4068e56eb07a6e79d007aed4bc8257e10827c74ee422d82a29b2ce8cb07 9fead81d9df0513bb577f3b6c47843b17c964e7ff8f4198f32027533eaf5bcc1 |
| $RC_4$ | 5058cb975975ceff027d1326488912e199b79b916ad90a3fe2fd01508cd7d7c0 1bc8aaa4d21a8473fb15f3b151ab9e44172e9ccb70a5ea04495af3ec03b5153e |
| $RC_5$ | 84da272d13a44f0898ee4ea53334c255d894cc54d357c55466d760debde482a2 44c128df641e80673a8bc34a1620d880b7965e549f313ddccfd506b073413b87 |
| $RC_6$ | bb93aaa23b38ea96c9346ef91e184982bf50e91033f4354ecb20d3c7390c2b41 862e8825ec3d0fee0a6f978881f90728c6748e4aed8b732350075d6c2bdd8e4b |
| $RC_7$ | fe32f3eba76626dedf36622bfdc5ccd33db2f3e0dd7c3c128298ea78c1cc7fee 1a140edb8e57cd5824c7f4b817c0fc94e70da5b9399faaf9a848a46ad30679e9 |
| $RC_8$ | 952ba02486b818febc0ec98559df27c79357838f011b1e5bc11f2cfb6fc0573e 545978c2bc5b390f44907f8da0dfd68206fe4521f86ba6c879ec1e69caed9533 |
| $RC_9$ | b41e6bb4ed20294016399c268da6bf88c89e2dc118a361b3560ee8daed973a8f 9778df40e308c1206fa42f97f3fd3f63d2b4b3b57eb5bcbec6ad64d46216b692 |
| $RC_{10}$ | 6954a418cecc43633bd526c2499dfc16b832f58b216b9a8b226a6a0b7918d364 a7939004339de0ba08e2b547e64dc5622e24b0c4f8f415d9e0a84cb94b6c5f3f |
| $RC_{11}$ | 2e4b9ad37091e3e5a218c5e57b33ed3470ba4f31fbcf16424684fdd5cde38e88 9eae3f018b37af58c24ccc8af57abc2c6911408dd20ef6435e4494a3e6599a06 |
| $RC_{12}$ | aa42aca73bd7f8a17e987f281422b266e44f0de1615d2d393c620c8c5a2c80b4 f06178c8455bf98179603f2f1bcb30b2559f282c799e40533b0665f97a2a706a |

TABLE 1-continued

| Constant | Hex Value |
| --- | --- |
| $RC_{13}$ | 969c39ae2dc16834310344c0579d0ffdfde01772dbf9a4cab984953c395d7791<br>1510f39e5f37295e3611a1d461014 60daf731ddbdab1ec1bbc512edc44680d8d |
| $RC_{14}$ | 8a1e6ce31f0b526d884b584aa1a5ae4294fcf85fd2e525f959ed1a54233359c7<br>c5fece6d24775e7d4a9ad97c2632a3be5b331a8f580f557b269e7b65123a5992 |
| $RC_{15}$ | 9bd64a932f09672def04b6a94753a3e4087a1c3895078dc70927fcd774888dfd<br>400b95fd1c6a0b2a91a1ba44eea09f5163dba4dfa9da7b8eb97d791cab566437 |
| $RC_{16}$ | 48401f65c2d2d9e71fe47bd80b28d834eee8fff3be9aa4608cba33e6fedce0b1<br>693c80cdc36db7f504e4abea23ccc6729a030f5b3e035fb59c2c788215cf84a8 |

Notably, the present solution is suitable for implementation on Field Programmable Gate Arrays ("FPGAs"). Serial and fully parallel implementations can be used to meet area or performance constraints. The S-boxes may be implemented using composite field techniques and pipelined for higher performance. Also, the present solution can be integrated into Single Chip Crypto ("SCC") systems.

Furthermore, the present solution anticipates future security requirements. Post Quantum Security ("PQS") will become a requirement for radio product customers, as well as provable computational security and quantified theoretical security metrics and analysis processes. The present solution provides a security means that satisfies all of these requirements.

As evident from the above discussion, the present algorithm is highly customizable within a security margin. This customizability is useful in cases where different users want unique, proprietary algorithms. The following features of the present solution are customizable: (1) the state initialization; (2) the number of rounds R; (3) the permutation function $f$; (4) the number of bits N input into the round function; (5) the type, number, parameters and mapping function of the S-boxes; (6) the bitwise permutation function; (7) the mixing function; and (8) the round constants.

Figure 6:
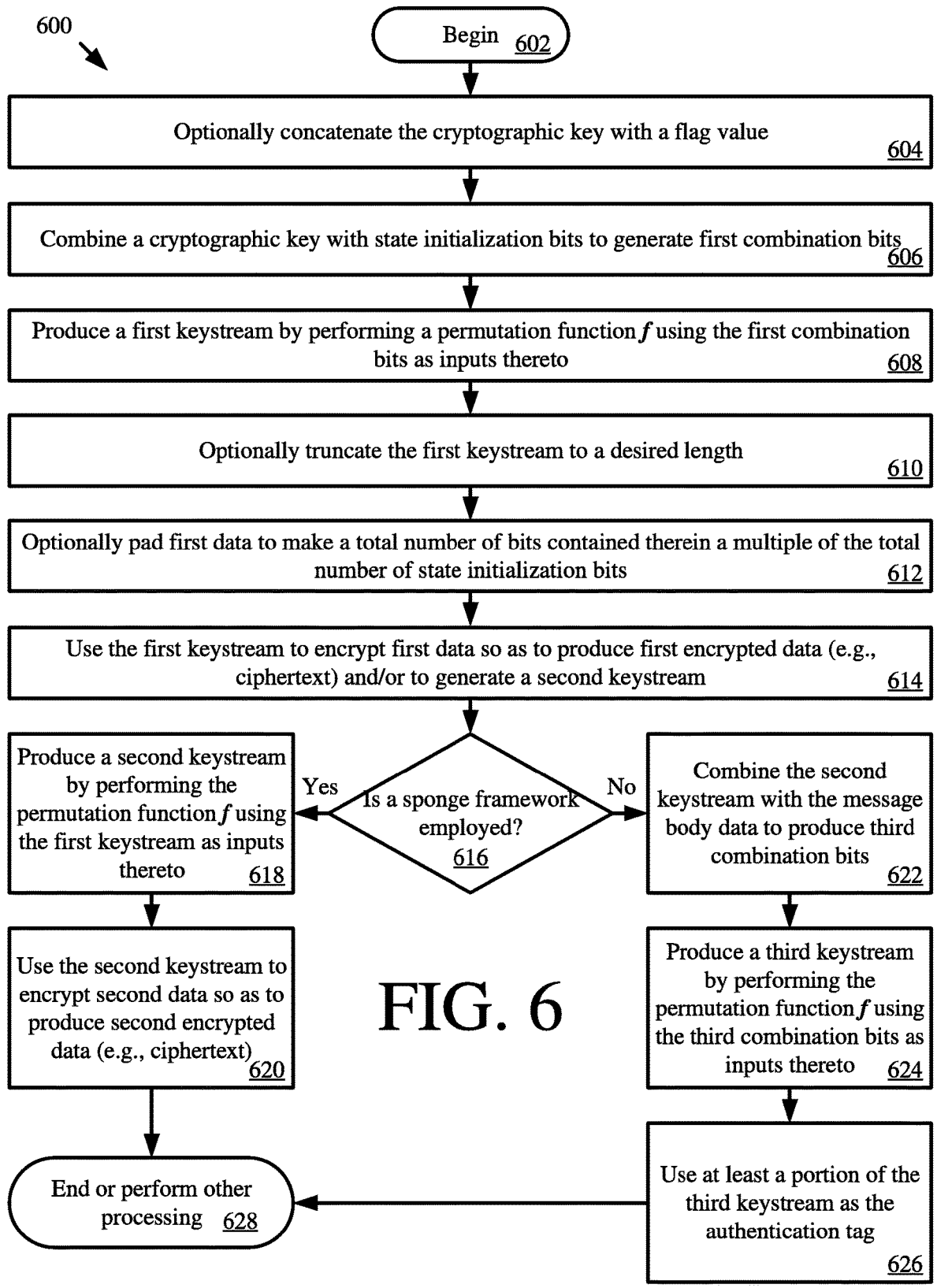
FIG. 6 is a flow diagram of an illustrative method for generating encrypted data.

Referring now to FIG. 6, there is provided a flow diagram of an illustrative method 600 for generating encrypted data (e.g., ciphertext) that is useful for understanding the present solution. Method 600 begins with step 602 and continues with optional step 604. In optional step 604, a cryptographic key is concatenated with a flag value. Next in step 606, the cryptographic key is combined with state initialization bits to generate the first combination bits. A multi-bit value for the state initialization bits may be selected such that it is unique for a given application.

The first combination bits are then used to produce a first keystream, as shown by step 608. The first keystream may optionally be truncated to a desired length, as shown by step 610. The first keystream is produced using a permutation function $f$. The permutation function $f$ is performed using the first combination bits as inputs thereof. The permutation function $f$ comprises a round function $f_{round}$ that is iterated R times. The round function $f_{round}$ consists of (1) a substitution layer in which the first combination bits are substituted with substitute bits, (2) a permutation layer in which the substitute bits are re-arranged, (3) a mixing layer in which at least two outputs of the permutation layer are combined together, and (4) an addition layer in which a constant is added to the output of the mixing layer.

After completing optional step 610, method 600 continues with another optional step 612. Step 612 involves padding the first data to make a total number of bits contained therein a multiple of the total number of state initialization bits prior to being encrypted. The first data is then encrypted using the first keystream, as shown by step 614. In this regard, the first data may be combined with the first keystream using modular arithmetic (e.g., modulo 2 addition). The first data comprises, but is not limited to, authentication data and/or message body data.

If a sponge framework is employed [616:YES], then steps 618-620 are performed. Step 618 involves producing a second keystream by performing the permutation function $f$ using the first keystream as inputs thereto. Step 620 involves using the second keystream to encrypt the second data so as to produce the second encrypted data (e.g., ciphertext). Upon completing step 620, method 600 ends or other processing is performed (e.g., repeat steps 618-620 for a next block of message data), as shown by step 628.

If a duplex framework is employed [616:NO], then steps 622-626 are performed. Prior to discussing steps 622-626, it should be understood that in the duplex context the first encrypted data (e.g., ciphertext) is produced in previous step 614 by: combining the first keystream with authentication data to generate the second combination bits; producing a second keystream by performing the permutation function $f$ using the second combination bits as inputs thereto; and combining the second keystream with the message body data so as to produce the first encrypted data (e.g., ciphertext). The second keystream is also used in step 622 to produce the third combination bits. The third combination bits are input into the permutation function $f$, as shown by step 624. As a result of performing the permutation function $f$, a third keystream is produced. At least a portion of the third keystream is used as an authentication tag.

Figure 7:
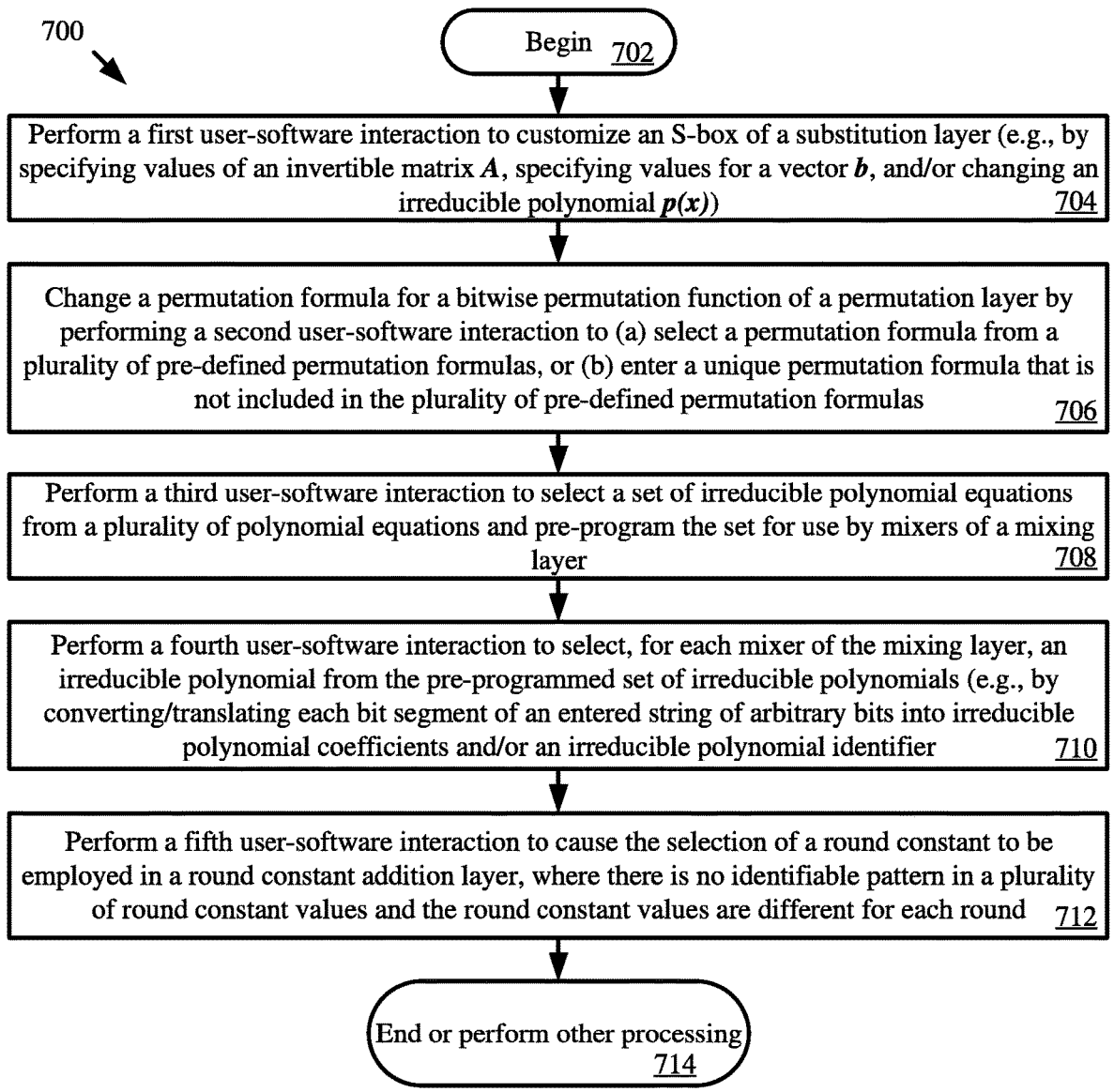
FIG. 7 is a flow diagram of an illustrative method for customizing a permutation function $f$.

FIG. 7 is a flow diagram of an illustrative method 700 for customizing a permutation function $f$. Notably, the customization changes the permutation function $f$ without degenerating a security of the encryption/decryption algorithm.

As shown in FIG. 7 includes a plurality of blocks 704-712 to illustrate that the permutation function $f$ can be customized in various ways. FIG. 7 can be modified to eliminate any of the blocks or to show certain block as optional blocks. Also, the present solution is not limited to the order in which the blocks are shown in FIG. 7. For example, block 712 can reside before block 710.

As also shown in FIG. 7, method begins with 702 and continues with 704 where a first user-software interaction is performed to customize an S-box (e.g., S-box $402_1$, ..., or $402_{32}$ of FIG. 4) of a substitution layer (e.g., substitution layer 302 of FIG. 3). The customization is achieved by changing a polynomial equation and/or by changing an input-to-output bit mapping, such that the S-box (1) has input values and output values that are all different, (2) does not have an output value that is equal to the corresponding input value, (3) does not have an output value that is a bitwise complement of the corresponding input value, (4) has a maximum differential probability of $2^{-14}$ or smaller, and (5) has a maximum linear bias of $2^{-8}$ or smaller. In some scenarios, the input-to-output bit mapping is changed by specifying values of at least one of a multi-bit invertible matrix A and a multi-bit vector b for the mathematical equation $S(x)=A \cdot x^{-1}+b$, where x is a multi-bit input. The values may be randomly selected in accordance with a chaotic, random or pseudo-random number algorithm. The same or different chaotic, random or pseudo-random number algorithm can be used to specify values for the multi-bit invertible matrix A and the multi-bit vector b. The first user-software interaction can be achieved using an input device (e.g., a touch screen 854 of FIG. 8, a keypad 850 of FIG. 8, a mouse, a drop down menu or any other input means) provided by a computing device (such as that shown in FIG. 8).

Next in 706, a permutation formula is changed for a bitwise permutation function of a permutation layer (e.g., permutation layer 304 of FIG. 3). This change can be achieved by performing a second user-software interaction to (a) select a permutation formula from a plurality of predefined permutation formulas, or (b) enter a unique permutation formula that is not included in the plurality of predefined permutation formulas. This change must be made such that the following criteria is met: (1) each output bit of a given S-box goes to a different mixer's input bit; (2) bit positions of bits input to the permutation layer are different than the positions of corresponding bits output from the permutation layer; and (3) an order of each bit position is greater than a number of rounds in a bijective function. The second user-software interaction can be achieved using a touch screen, a key pad, a mouse, a drop down menu or any other input means provided by a computing device (such as that shown in FIG. 8).

In 708, a third user-software interaction is performed to select a set of irreducible polynomial equations from a plurality of polynomial equations. The selected set is pre-program for possible use by mixers (e.g., mixers $406_1, \ldots, 406_{16}$ of FIG. 4) of a mixing layer (e.g., mixing layer 306 of FIG. 3). In some scenarios, each of the plurality of polynomial equations comprises a degree-16 irreducible polynomial equation.

A fourth user-software interaction is performed in 710 to select, for each mixer of the mixing layer, an irreducible polynomial p(x) from the pre-programmed set of irreducible polynomials. This selecting can be achieved by: receiving a first user-software interaction for entering a first bit string comprising a plurality of first arbitrary bits; breaking the first bit string into a plurality of equal length segments each comprising only a portion of the plurality of first bits; and converting/translating each of the equal length segments into irreducible polynomial coefficients into irreducible polynomial coefficients and/or an irreducible polynomial identifier, as described above. Thereafter, a respective mixer of the mixing layer is caused to use the irreducible polynomial coefficients and/or the identified irreducible polynomial. In some scenarios, the third user-software interaction of 708 is performed at the factory, while the fourth user-software interaction of 710 is performed in the field.

In 712, a fifth user-software interaction is performed to cause the selection of a round constant to be employed in a round constant addition layer (e.g., round constant addition layer 308 of FIG. 3). Notably, the selection is made such that (1) there is no identifiable pattern in a plurality of round constant values and (2) the round constant values are different for each round. In some scenarios, each round constant value of the plurality of round constant values has the same number of 0's and 1's, and/or is chosen at random. Subsequently, 714 is performed where method 700 ends or other processing is performed.

Figure 8:
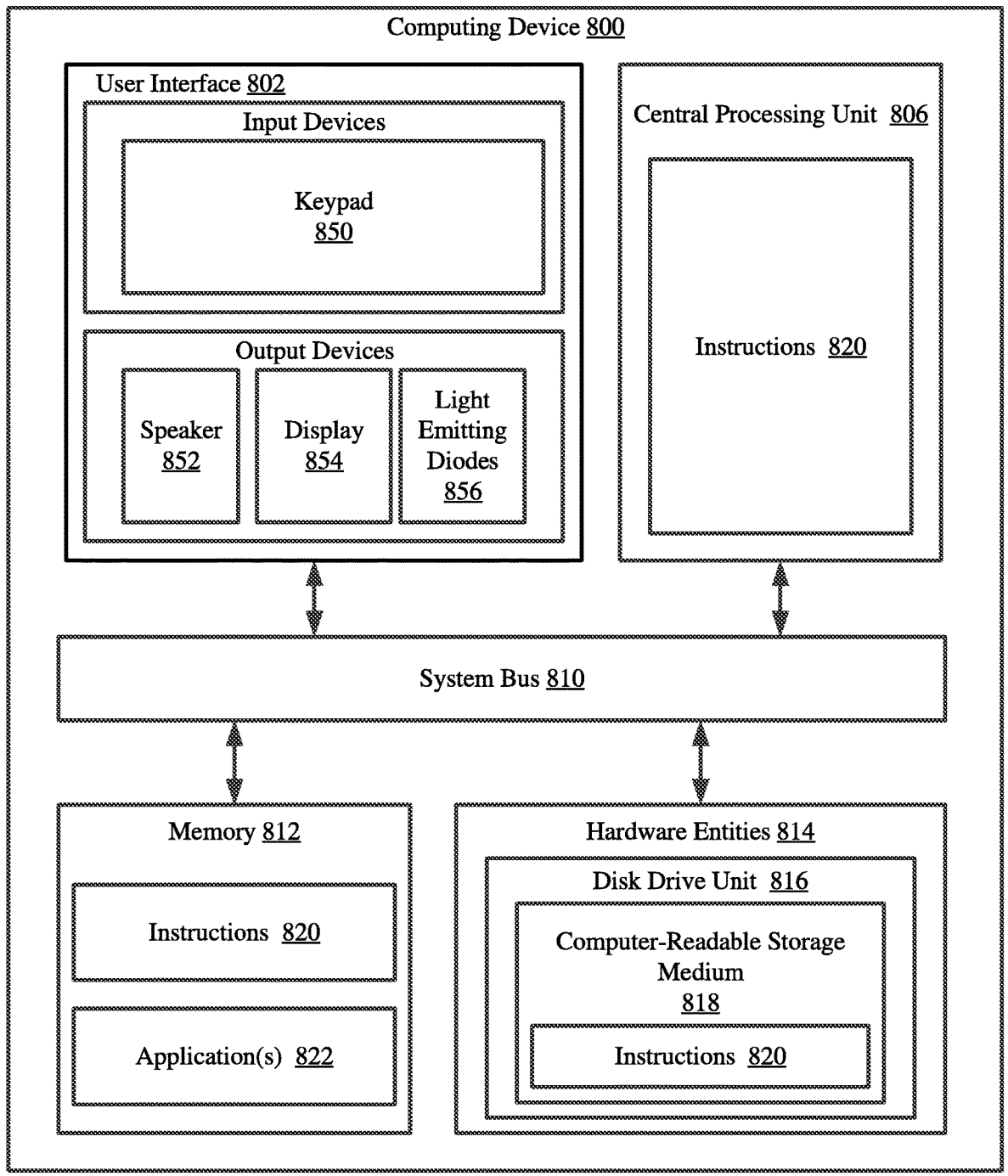
FIG. 8 is an illustration of an illustrative computing device that can be used to customize a permutation function $f$.

Referring now to FIG. 8, there is provided a detailed block diagram of an illustrative architecture for a computing device 800. The computing device 800 is generally configured to allow a cryptographic algorithm to be customized (and more particularly a permutation function $f$ as described above). In this regard, the computing device 800 implements the cryptographic algorithm and/or is able to communicate with another electronic device (e.g., a communications device, such as a handheld radio) implementing the cryptographic algorithm.

The computing device 800 may include more or less components than those shown in FIG. 8. However, the components shown are sufficient to disclose an illustrative embodiment implementing the present solution. The hardware architecture of FIG. 8 represents one embodiment of a representative server configured to facilitate inventory counts and management. As such, the computing device 800 of FIG. 8 implements at least a portion of a method for customizing a permutation function $f$.

Some or all the components of the computing device 800 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 8, the computing device 800 comprises a user interface 802, a CPU 806, a system bus 810, a memory 812 connected to and accessible by other portions of computing device 800 through system bus 810, and hardware entities 814 connected to system bus 810. The user interface can include input devices (e.g., a keypad 850) and output devices (e.g., speaker 852, a display 854, and/or light emitting diodes 856), which facilitate user-software interactions for controlling operations of the computing device 800.

At least some of the hardware entities 814 perform actions involving access to and use of memory 812, which can be a RAM, a disk driver and/or a Compact Disc Read Only Memory ("CD-ROM"). Hardware entities 814 can include a disk drive unit 816 comprising a computer-readable storage medium 818 on which is stored one or more sets of instructions 820 (e.g., software code) configured to implement one or more of the methodologies, procedures, or functions described herein. The instructions 820 can also reside, completely or at least partially, within the memory 812 and/or within the CPU 806 during execution thereof by the computing device 800. The memory 812 and the CPU 806 also can constitute machine-readable media. The term "machine-readable media", as used here, refers to a single medium or multiple media (e.g., a centralized or distributed database, and/or associated caches and servers) that store the one or more sets of instructions 820. The term "machine-readable media", as used here, also refers to any medium that is capable of storing, encoding or carrying a set of instructions 820 for execution by the computing device 800 and that cause the computing device 800 to perform any one or more of the methodologies of the present disclosure.

In some scenarios, the hardware entities 814 include an electronic circuit (e.g., a processor) programmed for facilitating the customization of a cryptographic algorithm. In this regard, it should be understood that the electronic circuit can access and run a software application 822 installed on the computing device 800. The software application 822 is generally operative to facilitate: a first user-software interaction to customize an S-box of a substitution layer by randomly specifying values of an invertible matrix A and a vector b; a second user-software interaction to (a) select a permutation formula from a plurality of predefined permutation formulas, or (b) enter a unique permutation formula that is not included in the plurality of predefined permutation formulas; a third user-software interaction to select an irreducible polynomial p(x) from a plurality of irreducible polynomials to be used in each mixer of a mixing layer; and/or a fourth user-software interaction to cause the random selection of at least one round constant to be employed in a round constant addition layer, where each bit in the selected round constant is a 0 or 1 with probability 0.5. Other functions of the software application 822 are apparent from the above discussion.

All of the apparatus, methods, and algorithms disclosed and claimed herein can be made and executed without undue experimentation in light of the present disclosure. While the present solution has been described in terms of preferred embodiments, it will be apparent to those having ordinary skill in the art that variations may be applied to the apparatus, methods and sequence of steps of the method without departing from the concept, spirit and scope of the present solution. More specifically, it will be apparent that certain components may be added to, combined with, or substituted for the components described herein while the same or similar results would be achieved. All such similar substitutes and modifications apparent to those having ordinary skill in the art are deemed to be within the spirit, scope and concept of the present solution as defined.

The features and functions disclosed above, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

We claim:

1. A method for customizing a cryptographic algorithm, comprising:
    providing an electronic device with the cryptographic algorithm implementing a permutation function $f$ configured to produce a first keystream using bits input thereto, the permutation function $f$ comprising a round function $f_{round}$ consisting of a mixing layer in which input bits are combined together; and
    customizing the mixing layer of the permutation function $f$ while the electronic device is in the field by
        receiving, by the electronic device, a first user-software interaction for entering a first bit string comprising a plurality of first arbitrary bits,
        breaking the first bit string into a plurality of equal length segments each comprising only a portion of the plurality of first bits,
        translating each of the equal length segments into irreducible polynomial coefficients, and
        causing a respective one of a plurality of mixers comprising the mixing layer to use the irreducible polynomial coefficients;
    selecting irreducible polynomial equations from a plurality of polynomial equations; and
    causing the selected irreducible polynomial equations to be used by the mixers of the mixing layer.

2. The method according to claim 1, wherein the customizing changes the cryptographic algorithm without degenerating a security of the cryptographic algorithm.

3. The method according to claim 1, wherein each of the plurality of polynomial equations comprises a degree-16 irreducible polynomial equation.

4. The method according to claim 1, wherein the round function $f_{round}$ further consists of a substitution layer in which input bits are substituted with substitute bits.

5. The method according to claim 4, wherein bit substitutions of the substitution layer are performed by a plurality of customizable S-boxes.

6. The method according to claim 5, further comprising customizing at least one S-box of the plurality of customizable S-boxes by changing a polynomial equation.

7. The method according to claim 1, wherein the round function $f_{round}$ further consists of a customizable permutation layer in which bits are rearranged.

8. The method according to claim 7, further comprising customizing the customizable permutation layer by changing a permutation formula such that the following criteria is met:
(1) each output bit of a given S-box goes to a different mixer's input bit;
(2) bit positions of bits input to the permutation layer are different than the positions of corresponding bits output from the permutation layer; and
(3) an order of each bit position is greater than a number of rounds in a bijective function.

9. The method according to claim 1, wherein the round function $f_{round}$ further consists of a customizable addition layer in which a constant is added to an output of the mixing layer.

10. The method according to claim 9, further comprising customizing the customizable addition layer by selecting a plurality of round constant values such that (1) there are no identifiable patterns in the plurality of round constant values and (2) the round constant values are different for each round.

11. The method according to claim 10, wherein each round constant value of the plurality of round constant values has the same number of 0's and 1's.

12. The method according to claim 10, wherein each round constant value is chosen at random.

13. The A method for customizing a cryptographic algorithm, comprising:
    providing an electronic device with the cryptographic algorithm implementing a permutation function $f$ configured to produce a first keystream using bits input thereto, the permutation function $f$ comprising a round function $f_{round}$ consisting of a mixing layer in which input bits are combined together; and
    customizing the mixing layer of the permutation function $f$ while the electronic device is in the field by
        receiving, by the electronic device, a first user-software interaction for entering a first bit string comprising a plurality of first arbitrary bits,
        breaking the first bit string into a plurality of equal length segments each comprising only a portion of the plurality of first bits,
        translating each of the equal length segments into irreducible polynomial coefficients, and
        causing a respective one of a plurality of mixers comprising the mixing layer to use the irreducible polynomial coefficients
    wherein the round function $f_{round}$ further consists of a substitution layer in which input bits are substituted with substitute bits; and
    wherein bit substitutions of the substitution layer are performed by a plurality of customizable S-boxes; and wherein at least one S-box of the plurality of customizable S-boxes is customized by changing an input-to-output bit mapping, such that the S-box:
(1) has input values and output values that are all different;
(2) does not have an output value that is equal to the corresponding input value;
(3) does not have an output value that is a bitwise complement of the corresponding input value;
(4) has a maximum differential probability of $2^{-14}$ or smaller; and
(5) has a maximum linear bias of $2^{-8}$ or smaller.

14. The method according to claim 13, wherein the input-to-output bit mapping is changed by specifying values of at least one of a multi-bit invertible matrix A and a multi-bit vector b for the mathematical equation $S(x)= A \cdot x^{-1}+b$, where x is a multi-bit input.

15. The method according to claim 14, wherein the values are randomly selected in accordance with a chaotic, random or pseudo-random number algorithm.

16. The method according to claim 15, where the same or different chaotic, random or pseudo-random number algorithm is used to specify values for the multi-bit invertible matrix A and the multi-bit vector b.

17. A system, comprising:
an electronic circuit programmed with a cryptographic algorithm implementing a permutation function $f$ configured to produce a first keystream using bits input thereto, the permutation function $f$ comprising a round function $f_{round}$ consisting of a mixing layer in which input bits are combined together;
wherein the electronic circuit is configured to perform the following operations for facilitating a customization of the permutation function $f$ while the electronic device is in the field:
receive a first user-software interaction for entering a first bit string comprising a plurality of first arbitrary bits,
break the first bit string into a plurality of equal length segments each comprising only a portion of the plurality of first bits,
translate each of the equal length segments into irreducible polynomial coefficients, and
cause a respective one of a plurality of mixers comprising the mixing layer to use the irreducible polynomial coefficients;
wherein the electronic circuit is further configured to select irreducible polynomial equations from a plurality of polynomial equations, and cause the selected irreducible polynomial equations to be used by the mixers of the mixing layer.

18. The system according to claim 17, wherein the customization changes the cryptographic algorithm without degenerating a security of the cryptographic algorithm.

19. The system according to claim 17, wherein each of the plurality of polynomial equations comprises a degree-16 irreducible polynomial equation.

20. The system according to claim 17, wherein the round function $f_{round}$ further consists of a substitution layer in which input bits are substituted with substitute bits.

21. The system according to claim 20, wherein bit substitutions of the substitution layer are performed by a plurality of customizable S-boxes.

22. The system according to claim 21, wherein the electronic circuit is further configured to receive a third user-software interaction for customizing at least one S-box of the plurality of customizable S-boxes by changing a polynomial equation.

23. The system according to claim 17, wherein the round function $f_{round}$ further consists of a customizable permutation layer in which bits are rearranged.

24. The system according to claim 23, wherein the electronic circuit is further configured to receive a fifth user-software interaction for customizing the customizable permutation layer by changing a permutation formula such that the following criteria is met:
(1) each output bit of a given S-box goes to a different mixer's input bit;
(2) bit positions of bits input to the permutation layer are different than the positions of corresponding bits output from the permutation layer; and
(3) an order of each bit position is greater than a number of rounds in a bijective function.

25. The system according to claim 17, wherein the round function $f_{round}$ further consists of a customizable addition layer in which a constant is added to an output of the mixing layer.

26. The system according to claim 25, wherein the electronic circuit is further configured to receive a sixth user-software interaction for customizing the customizable addition layer by selecting a plurality of round constant values such that (1) there are no identifiable patterns in the plurality of round constant values and (2) the round constant values are different for each round.

27. The system according to claim 26, wherein each round constant value of the plurality of round constant values has the same number of 0's and 1's.

28. The system according to claim 26, where each round constant value is chosen at random.

29. A system, comprising:
an electronic circuit programmed with a cryptographic algorithm implementing a permutation function $f$ configured to produce a first keystream using bits input thereto, the permutation function $f$ comprising a round function $f_{round}$ consisting of a mixing layer in which input bits are combined together;
wherein the electronic circuit is configured to perform the following operations for facilitating a customization of the permutation function $f$ while the electronic device is in the field:
receive a first user-software interaction for entering a first bit string comprising a plurality of first arbitrary bits,
break the first bit string into a plurality of equal length segments each comprising only a portion of the plurality of first bits,
translate each of the equal length segments into irreducible polynomial coefficients, and
cause a respective one of a plurality of mixers comprising the mixing layer to use the irreducible polynomial coefficients
wherein the round function $f_{round}$ further consists of a substitution layer in which input bits are substituted with substitute bits;
wherein bit substitutions of the substitution layer are performed by a plurality of customizable S-boxes; and
wherein the electronic circuit is further configured to receive a fourth user-software interaction for customizing at least one S-box of the plurality of customizable S-boxes by changing an input-to-output bit mapping, such that the S-box:
(1) has input values and output values that are all different;
(2) does not have an output value that is equal to the corresponding input value;

(3) does not have an output value that is a bitwise complement of the corresponding input value;
(4) has a maximum differential probability of $2^{-14}$ or smaller; and
(5) has a maximum linear bias of $2^{-8}$ or smaller.

30. The system according to claim 29, wherein the input-to-output bit mapping is changed by specifying values of at least one of a multi-bit invertible matrix A and a multi-bit vector b for the mathematical equation $S(x)=A \cdot x^{-1}+b$, where x is a multi-bit input.

31. The system according to claim 30, wherein the values are randomly selected in accordance with a chaotic, random or pseudo-random number algorithm.

32. The system according to claim 31, where the same or different chaotic, random or pseudo-random number algorithm is used to specify values for the multi-bit invertible matrix A and the multi-bit vector b.

* * * * *